(12) United States Patent
Giese et al.

(10) Patent No.: US 7,244,910 B2
(45) Date of Patent: Jul. 17, 2007

(54) WELDING TORCH NIPPLE

(75) Inventors: William R. Giese, Monee, IL (US);
Robert Warning, Cedar Lake, IN (US);
Jeremy Jansma, South Holland, IL (US)

(73) Assignee: Illinois Tool Works Inc., Glenview, IL (US)

( * ) Notice: Subject to any disclaimer, the term of this patent is extended or adjusted under 35 U.S.C. 154(b) by 33 days.

(21) Appl. No.: 11/102,443

(22) Filed: Apr. 8, 2005

(65) Prior Publication Data

US 2006/0226133 A1    Oct. 12, 2006

(51) Int. Cl.
*B23K 9/00* (2006.01)
(52) U.S. Cl. ................................. 219/137.31
(58) Field of Classification Search .......... 219/137.31, 219/137.63, 137.9; 901/42
See application file for complete search history.

(56) References Cited

U.S. PATENT DOCUMENTS

| | | | | |
|---|---|---|---|---|
| 4,554,433 A | * | 11/1985 | Toothaker .............. | 219/137.63 |
| 4,582,979 A | * | 4/1986 | Moerke ................. | 219/137.63 |
| 5,451,117 A | | 9/1995 | Lajoie ........................ | 403/356 |
| 5,584,426 A | * | 12/1996 | Ziesenis ...................... | 228/41 |
| 5,866,874 A | * | 2/1999 | Haczynski et al. .... | 219/137.31 |
| 6,078,023 A | * | 6/2000 | Jones et al. ............ | 219/137.63 |
| 2005/0072764 A1 | * | 4/2005 | Lajoie ..................... | 219/76.14 |

* cited by examiner

*Primary Examiner*—Kevin P. Kerns
(74) *Attorney, Agent, or Firm*—Fletcher Yoder

(57) ABSTRACT

In accordance with one embodiment, there is provided a welding torch nipple for coupling a welding cable and neck assembly to one another. The exemplary nipple includes two hollow tubes: an inner tube disposed in an outer tube. The inner tube includes features that facilitate mating with a welding cable and the outer tube is configured to receive a neck assembly. A dielectric layer disposed between the inner and outer tubes electrically isolates the outer tube from the inner tube, thereby protecting a user from electrical shock, for instance. The dielectric layer includes a stem portion that extends radially into the outer tube, blocking axial separation of the outer tube and the dielectric layer.

32 Claims, 4 Drawing Sheets

WELDING TORCH NIPPLE

BACKGROUND

The present invention relates generally to welding torches and, particularly, to a welding torch nipple for coupling a welding torch to a welding cable.

Several common metal welding techniques employ heat generated by electrical arcing to transition workpieces and/or filler metal to a molten state, for welding the workpieces together. One technique that employs this arcing principle is wire-feed welding. At its essence, wire-feed welding involves routing current from a power source and into a wire electrode that is brought into close proximity with the workpieces. When close enough, current arcs from the wire electrode to the workpieces, completing a circuit and generating sufficient heat to weld the workpieces to one another. Often, the wire electrode is consumed and becomes part of the weld itself. This technique is commonly referred to in the industry as gas metal arc welding (GMAW or MIG).

MIG welding traditionally requires the use of a welding torch to direct and route welding resources (e.g., electrical current, wire-electrode, shielding gas) toward the welding location. Specifically, such welding torches are connected to a welding cable that provides these resources, and include a neck assembly from which the welding resources egress toward the weld location. To couple the welding cable to the neck assembly, welding torches traditionally include a nipple that receives the welding cable and that routes these welding resources to the neck assembly.

Generally, such nipples are formed of two tubes: an inner tube disposed in an outer tube. The outer tube forms the outer shell of the nipple, and the inner tube engages with the welding cable to receive the welding resources. However, to protect a user from electrical shock, for instance, traditional nipples include a plastic layer disposed between the two tubes, thereby electrically isolating the outer tube from the inner tube.

Traditionally, this plastic layer is inserted between the two tubes by a press-fitting operation. Unfortunately, press-fitting operations often lead to bad alignment between the two tubes. That is, press-fitting often leads to misalignment between the central axes of the two tubes. Additionally, press-fitting can be a relatively taxing process, consuming valuable time and resources. Further still, press-fitting the plastic layer precludes a design in which a portion of the plastic layer extends radially beyond the smallest inner diameter of the outer tube. That is, the maximum outer diameter of the plastic layer can be no greater than the smallest inner diameter of the outer tube, because the plastic layer must be inserted axially into the outer tube. As a consequence, traditional nipple designs generally require the use of a plastic set-screw, which extends radially through the inner and outer tubes, to maintain electrical isolation between the two tubes when securing the neck assembly and nipple to one another. Unfortunately, plastic set-screws are generally not as durable as and are generally more expensive than metallic set-screws. Moreover, the lack of radial mechanical engagement between the plastic layer and the outer tube can, over time, lead to axial separation of the plastic layer and outer tube with respect to one another.

Therefore, there exists a need for improved nipples for welding torches.

BRIEF DESCRIPTION

In accordance with one embodiment, the present invention provides a nipple assembly for a welding torch. The exemplary nipple assembly has a first end that is coupleable to a welding cable and includes a first hollow member disposed in and electrically isolated from a second hollow member. This electrical isolation is accomplished by a dielectric layer that circumscribes the first hollow member and, as such, that is disposed between the first and second hollow members. The dielectric layer includes a stem portion that extends radially beyond an inner surface of the second hollow member. Advantageously, this radially extending stem portion of the dielectric layer blocks axial separation of the second hollow member and the dielectric layer with respect to one another. Moreover, the stem portion facilitates the use of a metallic set-screw for the welding torch, by providing a chamber or channel that extends radially through both tubes but that maintains electrical isolation of the second hollow member.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
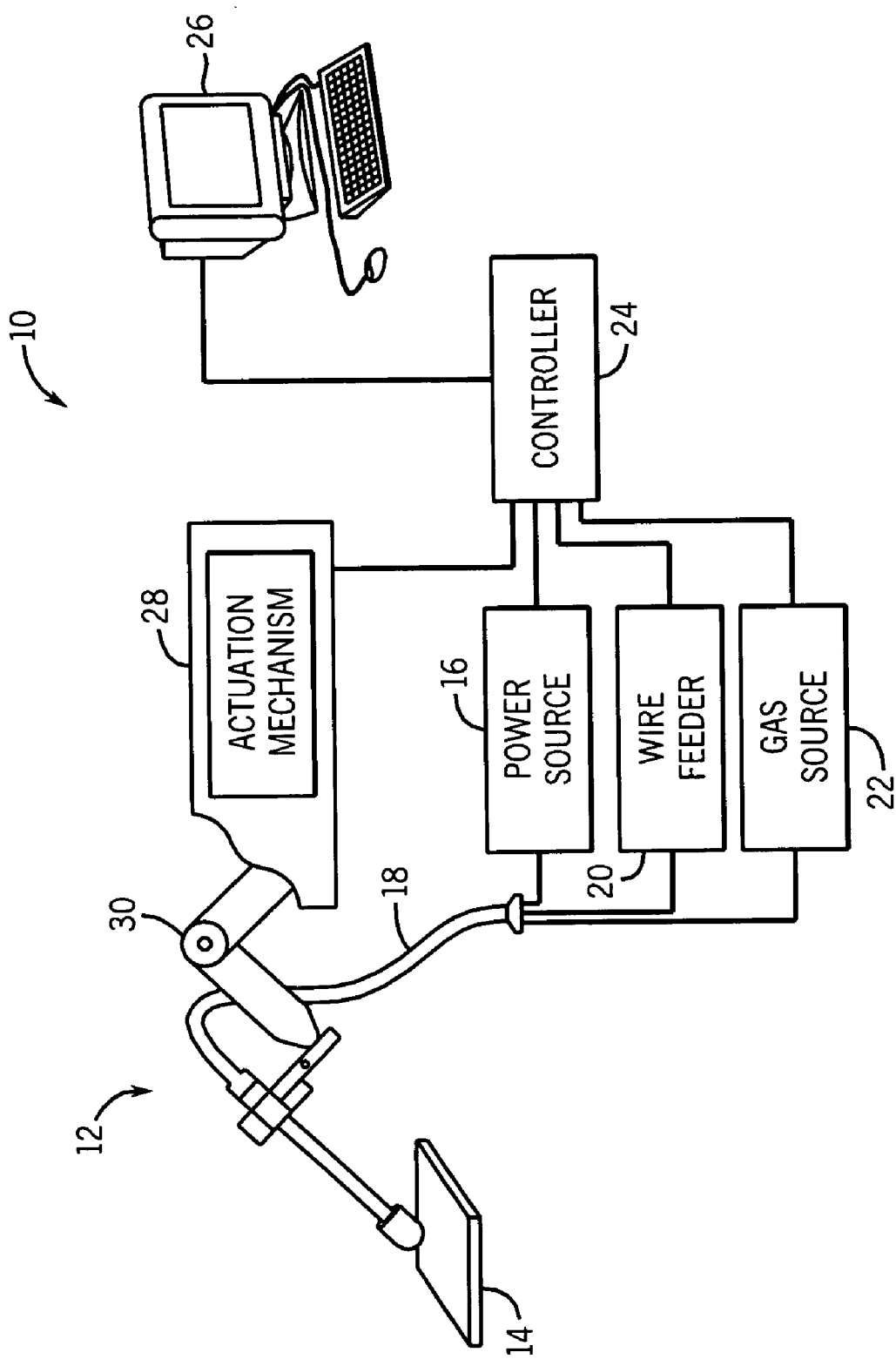
FIG. 1 is a diagrammatic representation of a robotic welding system, in accordance with an exemplary embodiment of the present invention.

Turning to the figures, FIG. 1 illustrates an exemplary gas shielded, wire-feed robotic welding system 10. Prior to continuing, however, it is again worth noting that the following discussion merely relates to exemplary embodiments of the present invention. As such, the appended claims should not be viewed as limited to those embodiments discussed herein. Indeed, the present invention provides benefits to both robotic and non-robotic welding systems as well as to both shielded and non-shielded welding devices. In summary, the present invention, which, in a general sense, relates to a welding torch nipple, is applicable to a vast number of welding systems and devices.

Returning to the exemplary welding system 10, it includes a welding torch 12 that defines the location of the welding operation with respect to a workpiece 14. Placement of the welding torch 12 at a location proximate to the workpiece 14 allows electrical current, which is provided by a power source 16 and routed to the welding torch 12 via a welding cable 18, to arc from the welding torch 12 to the workpiece 14. In summary, this arcing completes an electrical circuit from the power source 16, to the welding torch 12 via the welding cable 18, to a wire electrode, to the workpiece 14, and, at its conclusion, back to the power source 16, generally to ground. Advantageously, this arcing generates a relatively large amount of heat that causes the workpiece and/or filler metal to transition to a molten state, facilitating the weld.

To produce electrical arcing, the exemplary system 10 includes a wire-feeder 20 that provides a consumable wire electrode to the welding cable 18 and, in turn, to the welding torch 12. As discussed further below, the welding torch 12 conducts electrical current to the wire electrode via a contact tip (see FIG. 2), leading to arcing between the egressing wire electrode and the workpiece 14.

To shield the weld area from contaminants during welding and to enhance arc performance and improve the resulting weld, the exemplary system 10 includes a gas source 22 that feeds an inert, shielding gas to the welding torch 12 via the welding cable 18. As discussed in further detail below, the welding torch 12 directs the gas about the weld location. It is worth noting, however, that a variety of shielding materials, including various fluids and particulate solids, may be employed to protect the weld location. Moreover, the present invention is equally applicable to welding techniques in which a shielding material is not employed.

The exemplary system 10 also includes at least one controller 24 to manage the various functions and operations of the system 10. Types of suitable controllers 24 include programmable logic circuits (PLCs), solid state switches, microprocessors, among other devices. The controller 24 receives inputs from the various components of the system 10 (e.g., welding torch 12, power source 16, wire-feeder 20, and gas source 22) and provides appropriate responses to these components. For communications with a user, the controller 24 is coupled to a user interface 26. The user interface 26 displays information received by the controller 24, assisting a user in setting various operational parameters for the system 10, for example. Indeed, a user may directly control (i.e., provide command instructions to) the system 10 via the user interface 26.

The controller 24 also manages the operation of an actuation mechanism 28 that positions the welding torch 12 with respect to workpiece 14, thereby controlling the location of the weld. By way of example, the actuation mechanism 28 includes a hydraulically-actuated robotic arm 30, which is capable of articulating in various directions. The pattern of movement of the robotic arm 30 may be defined by a programmed routine stored in the controller 24 and entered via the user interface 26. As discussed further below, alignment of the various components of the welding torch 12 has particular importance when movements of the welding torch 12 are managed in an automated manner. For example, misalignment or improper installation of various components of the welding torch 12 can lead to welding operations occurring at an unintended and improper location on the work piece 14.

Figure 2:
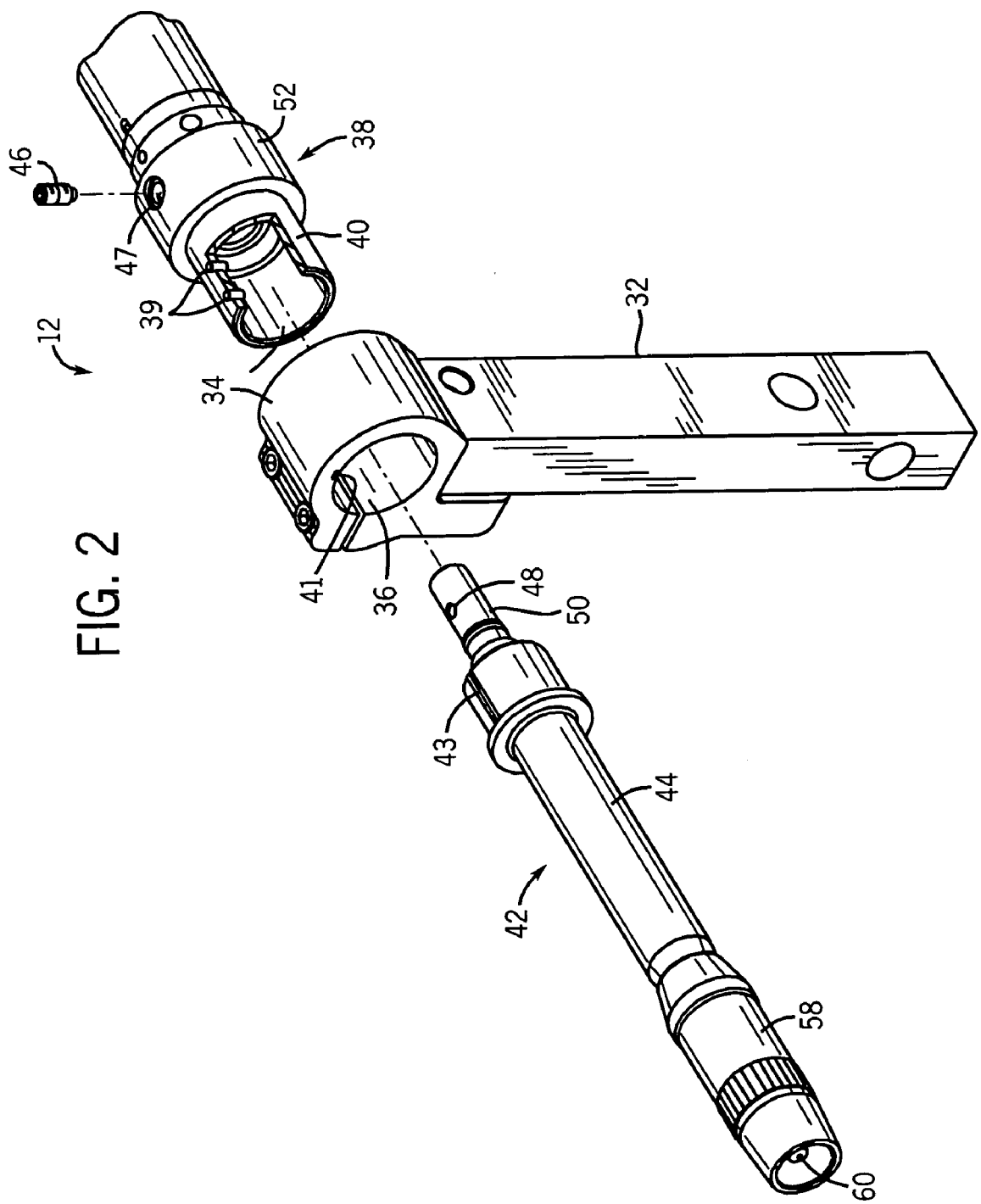
FIG. 2 is an exploded, perspective view of a welding torch of the welding system of FIG. 1.

Turning to FIG. 2, this figure illustrates an exploded, perspective view of the above-described welding torch 12. The welding torch 12 includes a mounting arm 32 that is securable to the robotic arm 30 (see FIG. 1) via a fastening mechanism, such as a bolt assembly or a screw. The mounting arm 32 carries a coupling member 34 that includes a receiving chamber 36 extending axially through the coupling member 34. The receiving chamber 36 is defined by an arcuate surface that matches the curvature of an external surface of a welding cable nipple 38. As illustrated in FIG. 2, the welding cable 18 is attached to one end of the nipple 38, and the opposite end is inserted into the receiving chamber 36 of the coupling member 34. By inserting the cable nipple 38 into the receiving chamber 36, the welding cable 18 can be secured to the mounting arm 32. Fasteners located on the coupling member 34 are tightened during assembly, causing the receiving chamber 36 to reduce in diameter and clamp with respect to the cable nipple 38.

Advantageously, to prevent rotation of the cable nipple 38 with respect to the coupling member 34, and for proper alignment of the cable nipple 38 with respect to the coupling member 34, a pair of alignment pins 39 that extend through a wall of the cable nipple 38 are aligned with and inserted into a corresponding keyway 41 located in the receiving chamber 36.

The cable nipple 38, once inserted into the coupling member 34, further receives a neck assembly 42, to secure the neck assembly 42 to the mounting arm 32. Specifically, a sleeve 40 of the cable nipple 38 receives the neck assembly 42. Once the neck assembly 42 is inserted, the cable nipple 38 not only facilitates securement of the neck assembly 42 to the mounting arm 32, but also facilitates coupling of the welding cable 18 and the neck assembly 42 to one another. As discussed further below, welding resources, such as electrical current, wire electrode, and shielding gas, are routed through the welding cable 18 and provided to the neck assembly 42 via the nipple 38. In turn, the neck assembly 42 provides and directs these resources to the desired weld location.

As illustrated, the neck assembly 42 includes two hollow members co-axial with respect to one another. Specifically, the exemplary neck assembly 42 includes an inner tube 50 disposed in an outer tube 44. Advantageously, the exemplary welding torch 12 includes features that aid in installation and alignment of the neck assembly 42 with respect to the remainder of the welding torch 12. For example, a keyway 43 located on the outer tube 44 of the neck assembly 42 mates with the alignment pins 39 of the cable nipple 38, thereby locking the angular position of the neck assembly 42 and the cable nipple 38 with respect to one another. As discussed above, the keyway 41 in the coupling member 34 mates with the pins 39 of the nipple 38, thereby fixing the angular position of the coupling member 34 and the nipple 38. Thus, the neck assembly 42, the nipple 38, and the coupling member 34 cannot pivot with respect to one another once assembled.

Additionally, the exemplary welding torch 12 includes a set-screw 46 that is received by and that extends through the cable nipple 38. Specifically, the set-screw 46 is disposed in a chamber 47 extending radially through the nipple 38. Once properly inserted, the set-screw 46 engages with a notch 48 located on the external surface of the inner tube 50 of the neck assembly 42, which is discussed further below. This engagement between the set-screw 46 and the notch 48 prevents axial separation of the neck assembly 42 and the cable nipple 38 with respect to one another. The set-screw 46 can be formed of a metallic material, to improve durability. Moreover, with the clamped relationship between the coupling member 34 and the cable nipple 38 in mind, the engagement of the set-screw 46, along with the abutment between a central flange 52 of the cable nipple 38 and the coupling member 34, cooperate to prevent axial separation of the neck assembly 42, coupling member 34, and cable nipple 38 with respect to one another.

The neck assembly 42, at an end away from and opposite to the coupling member 34, carries various features for delivering welding resources (e.g., electrical current, shielding gas, and wire electrode) to the weld location. For example, the exemplary welding torch 12 includes a nozzle 58 that is threaded onto a diffuser and that focuses egressing shielding gas towards the weld location. Additionally, the diffuser receives current and wire from the inner tube 50, and these resources are directed to a contact tip 60 that is seated with respect to the diffuser. The contact tip 60 is configured to electrically communicate with wire electrode extending therethrough and egressing therefrom. In other words, the exemplary contact tip 60 includes an axial channel that is only slightly larger in diameter than the wire electrode. Accordingly, the contact tip 60 comes into contact with the wire electrode, energizing the wire electrode emerging from the contact tip 60 and, in turn, facilitating arcing between the wire electrode and the workpiece.

Figure 3:
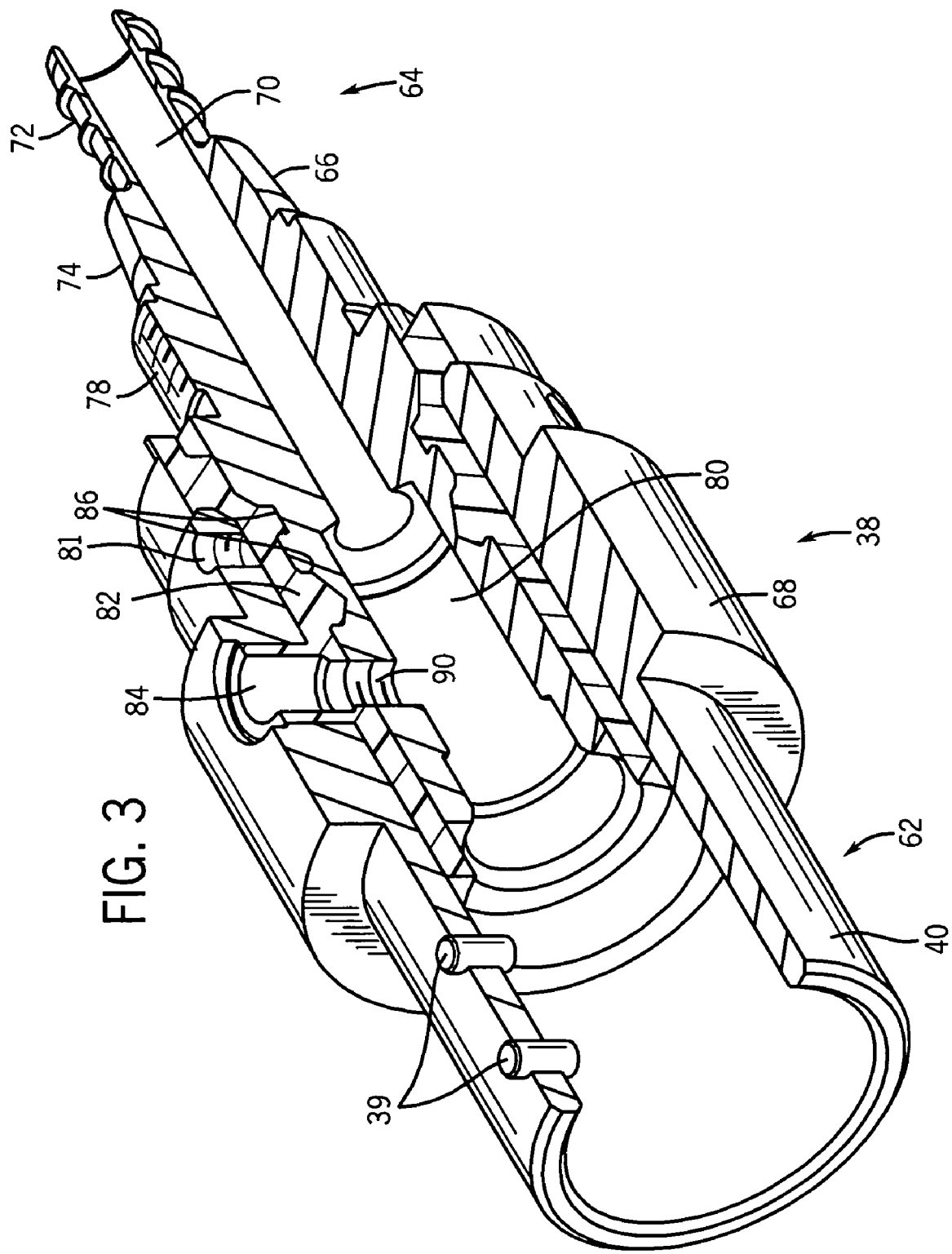
FIG. 3 is a perspective, cut-away of a welding torch nipple of the welding torch of FIG. 2.

Turning to FIG. 3, this figure illustrates a cut-away, perspective view of the nipple 38 of the welding torch. The exemplary nipple 38 generally has two ends: a torch end 62, which includes the sleeve 40 configured to receive the neck assembly 42, and a cable end 64 that is configured to mate with the welding cable 18 (see FIG. 2). As illustrated, the nipple 38 includes two hollow members co-axial with respect to one another. Specifically, the exemplary nipple 38 includes an inner nipple tube 66 disposed in an outer nipple tube 68. The outer nipple tube 68 defines most of the features of the torch end 62, while the inner nipple tube 66 defines most of the features on the cable end 64.

The inner tube 66 includes a central channel 70 that receives wire electrode and shielding gas from the welding cable 18. For example, when the welding cable 18 is secured to the cable end 64 of the nipple 38, a receiving stem 72, which is formed in the inner tube 66, engages with the portion of the cable that routes electrode and shielding gas through the cable. When mated, the receiving stem 72 of the nipple 38 is in fluidic communication with the welding cable 18. Additionally, when mated with welding cable 18, the exposed, outer peripheral surfaces 74 of the inner nipple tube 66 come into contact with electrically conductive portions of the welding cable 18. Thus, the outer peripheral surface of the inner tube 66 receives electrical current from the power source 16 (see FIG. 1) through the welding cable 18. Moreover, electrical current is routed through the inner nipple tube 66, as this member is formed of an electrically conductive material, such as brass or copper. In summary, the inner tube 66 of the welding nipple 38 receives the welding resources from the welding cable 18 and routes these resources to the neck assembly 42. Advantageously, to secure the welding cable 18, the inner tube 66 includes a threaded portion 78 that mates with a corresponding nut of the welding cable 18.

To facilitate the routing of these welding resources to the neck assembly 42, the inner nipple tube 66 includes a central bore 80 that is shaped to seat the inner tube 50 of the neck assembly 42. Indeed, the inner peripheral surface of the inner nipple tube 66 presents tolerances with respect to the outer peripheral surfaces of the inner tube 50 of the neck assembly 42 that ensure a suitable seal therebetween. When seated in the central bore 80, the inner tube 50 of the neck assembly 42 abuts against the peripheral surfaces of the inner nipple tube 66, thereby electrically coupling the two members. As such, electrical current is routed from the welding cable 18, into the inner nipple tube 66, and, in turn, into the inner tube 50 of the neck assembly 42. Additionally, when seated in the central bore 80, the inner tube 50 of the neck assembly 42 is in fluidic communication with the inner nipple tube 66. Accordingly, the inner tube 50 of the neck assembly 42 receives wire electrode and shielding gas from the inner nipple tube 66, specifically by way of the central channel 70.

Advantageously, as discussed above, the nipple 38 includes alignment pins 39 that ensure proper alignment between the nipple 38 and the neck assembly 42. Moreover, as also discussed above, the sleeve 40 of the nipple 38 also is sized with respect to the outer tube 44 of the neck assembly 42 as to provide for a good fit between these two structures. Additionally, the outer nipple tube 68 includes tapped portions 81 that are configured to mate with fasteners of the welding cable 18 to secure the welding cable 18 to the nipple 38.

As discussed above, the inner nipple tube 66 is electrically conductive and receives electrical current from the power source 16 via the welding cable 18. To prevent electrical current from passing to the outer nipple tube 68, the nipple 38 includes a dielectric layer 82 (i.e., electrically insulative material) disposed between the inner and outer nipple tubes. This dielectric layer 82 circumscribes the inner nipple tube 66 and electrically isolates the outer nipple 68 from the inner nipple tube 66. The dielectric layer 82 may be formed of any number of electrically insulative materials, such as a thermoset plastic or an injection-moldable plastic.

As illustrated, the dielectric layer 82 includes a stem portion 84 that extends radially outward and into the outer nipple tube 68. Specifically, the stem portion 84 radially extends into the chamber 47 that receives the set-screw 46. Additionally, the dielectric layer 82 extends radially inward and into grooves 86 formed in the inner nipple tube 66. This radial extension of the dielectric layer 82 into both the inner nipple tube 66 and outer nipple tube 68 blocks axial separation of these two tubes with respect to one another. Furthermore, the radially outward and inward extension of the dielectric layer 82 into the inner and outer nipple tubes blocks rotation of the inner and outer nipple tubes with respect to one another. In summary, the configuration of the dielectric layer 82 not only isolates the two nipple tubes from one another, but also secures the position of these two tubes with respect to one another, forming a unitary nipple 38.

Additionally, the extension of the stem portion 84 into the set-screw receiving chamber 47 facilitates the use of a metallic set-screw 46, because the stem portion 84 electrically isolates the chamber 47 from the set-screw 46. For example, in the illustrated nipple 38, the chamber 47, which is formed in the outer nipple tube 68, extends radially and completely through the outer nipple tube 68 and is in fluidic communication with a corresponding chamber 90 that extends radially and completely through the inner nipple tube 66. Thus, the set-screw 46 can be inserted into these chambers for engagement with the notch 48 on the inner tube 50 of the neck assembly 42, as discussed above. However, during operation, the inner nipple tube 66 and the inner tube 50 of the neck assembly 42 carry electrical current. Advantageously, the stem portion 84 of the dielectric layer 82 provides an electrically insulative layer that separates the inserted set-screw 46 from the outer nipple tube 68. Thus, electrical current is not passed to the outer nipple tube 68. Advantageously, the use of a metallic set-screw provides a more robust design in comparison to traditional assemblies, which require the use of a plastic set screw to provide for electrical isolation. Indeed, metallic set-screws are more effective in preventing axial separation of the neck assembly 42 and the nipple 38 with respect to one another and, furthermore, are generally less expensive than plastic set-screws.

Figure 4:
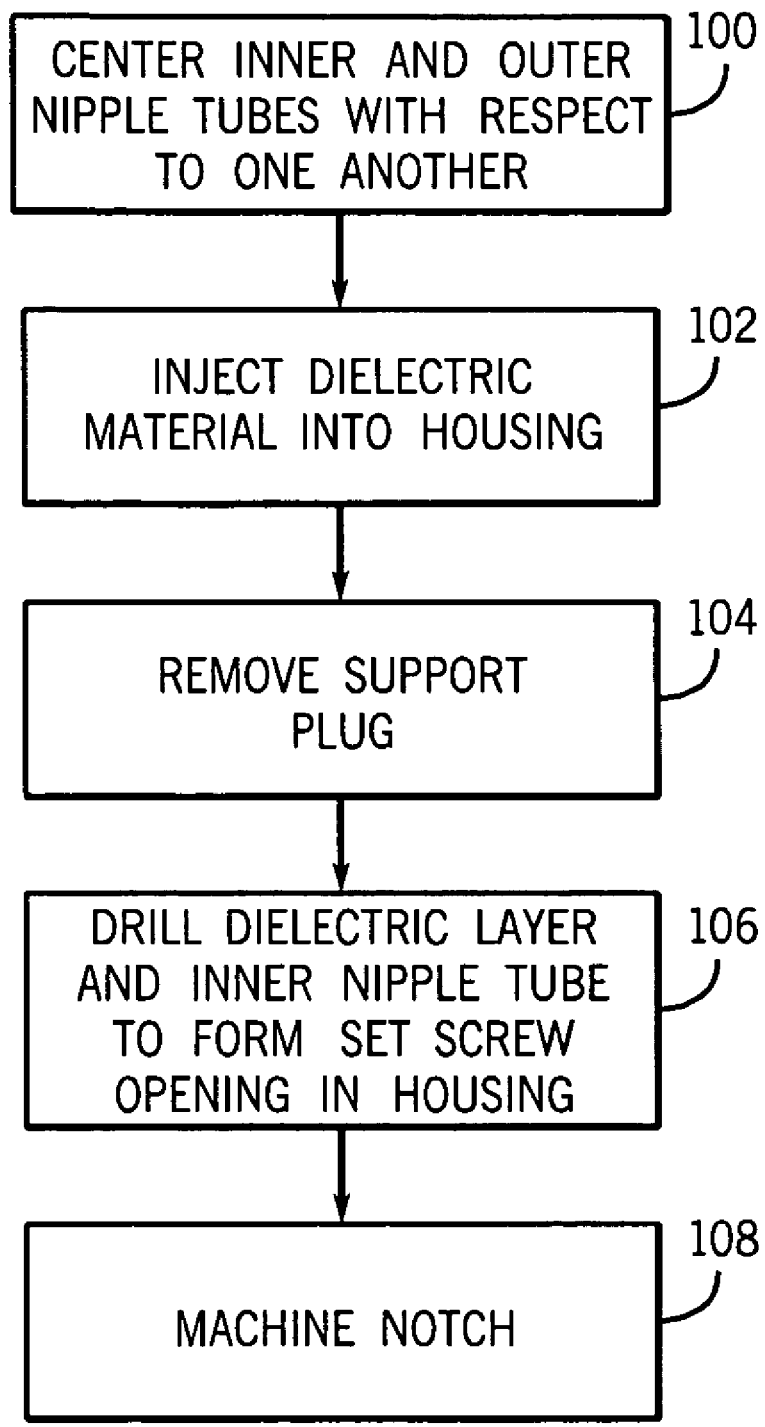
FIG. 4 is a block diagram representing an exemplary method of manufacturing a welding torch nipple, in accordance with an exemplary embodiment of the present invention.

FIG. 4 is a block diagram representative of an exemplary method for manufacturing a welding torch nipple 38. The exemplary method includes aligning the inner nipple tube 66 with the outer nipple tube 68. This may be effectuated by inserting a plug that is appropriately sized with respect to the outer nipple tube 68 and that supports the inner nipple tube 66 at the desired, final position in the nipple 38. Advantageously, the plug supports the inner nipple tube 66 in the assembly such that the outer and inner nipple tubes are co-axial with respect to one another, providing an annular space between the two nipple tubes. Block 100 represents this alignment. Once appropriately positioned, an electrically insulative material is introduced into the annular space between the inner and outer nipple tubes. By way of example, a thermoset material may be introduced through the chamber 47 in the outer nipple tube 68, and this thermoset material flows into the annular space between the two nipple tubes. Alternatively and as another example, an injection-moldable plastic may be introduced into the annular space between the tubes via the chamber 47. In either case, the viscosity of the introduced material allows it to flow into the grooves 86 in the inner nipple tube 66 and into the chamber 84 of the outer nipple tube 68. This flow of material forms the radial extensions of the dielectric layer 82 that block and, as such, prevent axial separation of the inner and outer nipple tubes with respect to one another. The introduction of the viscous material is represented by block 102. Upon hardening of the introduced dielectric material, the form support plug is removed, as represented by block 104.

The exemplary method also includes fabricating various features of the nipple 38. For example, the exemplary method includes tapping the inner nipple tube 66 to fabricate a passageway for receiving the set-screw 46. By way of example, drilling through the dielectric material or stem 84 in the chamber 47 of the outer nipple tube 68, through the inner nipple tube 66, and partially into the inner tube 50 of the neck assembly 42 forms the chambers 47 and 90 for the set-screw 46 as well as the engagement notch 48. These steps are represented by blocks 106 and 108. Advantageously, employing a single drilling operation facilitates good alignment between the formed chambers 47 and 90 and notch 48 for the set-screw 46.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A welding torch nipple, comprising:
    a first hollow member having a first end for coupling to a neck assembly;
    a second hollow member disposed in the first hollow member and having a second end opposite the first end and configured to receive a welding cable; and
    an electrically insulative material disposed between the first and second hollow members, wherein the electrically insulative material is disposed in a chamber extending radially and at least partially through the first member such that the first and second hollow members are not in contact with one another.

2. The welding torch nipple as recited in claim 1, wherein the electrically insulative material comprises a thermoset material.

3. The welding torch nipple as recited in claim 1, wherein the electrically insulative material comprises an injection-moldable material.

4. The welding torch nipple as recited in claim 1, wherein the electrically insulative material abuts an inner surface of the first hollow member and an outer surface of the second hollow member.

5. The welding torch nipple as recited in claim 1, wherein the second hollow member comprises brass or copper.

6. The welding torch nipple as recited in claim 1, comprising an additional chamber extending radially and completely through the second hollow member, wherein the additional chamber is in fluidic communication with the chamber.

7. A welding torch nipple, comprising:
    a first hollow member;
    an electrically conductive second hollow member disposed in the first hollow member and having an end for engagement with a welding cable; and
    a dielectric layer circumscribing the second hollow member to electrically isolate the first and second hollow members with respect to one another, the dielectric layer having a stem portion that extends radially into the first member.

8. The welding torch nipple as recited in claim 7, wherein the dielectric layer extends radially into a groove of the second hollow member.

9. The welding torch nipple as recited in claim 7, wherein the dielectric layer blocks axial separation of the first and second hollow members with respect to one another.

10. The welding torch nipple as recited in claim 7, wherein the first hollow member includes a channel extending radially and completely therethrough.

11. The welding torch nipple as recited in claim 10, wherein the stem portion is disposed in the channel.

12. The welding torch nipple as recited in claim 10, wherein the second hollow member includes an additional channel extending radially and completely therethrough, such that the channel and the additional channel are in fluidic communication with one another.

13. A welding torch, comprising:
    a neck assembly for conducting electrical current and routing wire electrode toward a weld location;
    a nipple including a first hollow member disposed in a second hollow member, the first hollow member having an end portion for engagement with a welding cable such that the first hollow member is in fluidic communication with and is electrically coupled to the welding cable; and
    an electrically insulating layer disposed between the first and second hollow members, the electrically insulating layer having a stem extending radially beyond an inner surface of the second hollow member.

14. The welding torch as recited in claim 13, wherein the neck assembly comprises a third hollow member disposed in and electrically isolated from a fourth hollow member, wherein the first hollow member is configured to receive the third hollow member and the second hollow member is configured to receive the fourth hollow member, such that the first and third hollow members are in fluidic communication with and electrically coupled to one another.

15. The welding torch as recited in claim 14, wherein the first and second hollow members respectively include a channel extending radially and completely therethrough the channels being in fluidic communication with one another, and wherein the third hollow member includes a recessed portion located on an outer surface thereof and configured to receive a metallic set-screw disposed in and extending through the channels.

16. The welding torch as recited in claim 13, wherein the electrically insulating layer comprises a thermoset material.

17. The welding torch as recited in claim 13, wherein the electrically insulating layer comprises an injection-moldable material.

18. The welding torch as recited in claim 13, wherein the first and second hollow members respectively include a channel extending radially and completely therethrough, the channels being in fluidic communication with one another.

19. A welding torch assembly, comprising:
a neck assembly configured to route wire electrode and conduct electrical current therethrough;
a nipple assembly comprising a first hollow member disposed in a second hollow member and a dielectric layer to electrically isolate the first and second hollow members with respect to one another, wherein the nipple assembly is configured to conduct electrical current and route a wire electrode from a welding cable to the neck assembly and wherein the dielectric layer includes a radially protruding portion located between the first and second hollow members and extending beyond an inner surface of the second hollow member; and
a coupling member having a receiving aperture extending axially therethrough, wherein the receiving aperture is sized to receive the nipple assembly, wherein the receiving aperture is configured to decrease in size to axially secure the nipple assembly thereto.

20. The welding torch as recited in claim 19, comprising an arm configured to secure the coupling assembly to a robotic arm.

21. The welding torch as recited in claim 20, comprising the robotic arm.

22. The welding torch as recited in claim 19, comprising the welding cable.

23. The welding torch as recited in claim 19, wherein the dielectric layer comprises an injection-moldable, thermoset plastic.

24. The welding torch as recited in claim 19, wherein the neck assembly comprises a third hollow member disposed in and electrically isolated from a fourth hollow member, wherein the first hollow member is configured to receive the third hollow member such that the first and third hollow members are in fluidic communication with and electrically coupled to one another.

25. The welding torch nipple as recited in claim 7, wherein the stem portion is hollow.

26. The welding torch nipple as recited in claim 7, wherein the stem portion is configured to receive a metallic set-screw.

27. The welding torch nipple as recited in claim 7, wherein the first and second hollow members are completely separated by the dielectric layer.

28. The welding torch as recited in claim 13, wherein the electrically insulating layer has an annular shape and the stem extends radially beyond an outer diameter of the annular shape.

29. The welding torch as recited in claim 13, wherein the first and second hollow members not in contact with one another.

30. The welding torch as recited in claim 13, wherein the stem has a passageway oriented in a radial direction relative to an axis of the first and second hollow members.

31. The welding torch assembly as recited in claim 19, wherein the first and second hollow members are completely separated by the dielectric layer.

32. The welding torch assembly as recited in claim 19, wherein the radially protruding portion is generally cylindrical and configured to receive a set-screw.

* * * * *